US006356434B1

United States Patent
Osterman

(10) Patent No.: US 6,356,434 B1
(45) Date of Patent: Mar. 12, 2002

(54) UNDERGROUND BATTERY VAULT SYSTEM FOR COMMUNICATIONS APPLICATIONS

(76) Inventor: Thomas A. Osterman, 911 Western Ave., Suite 206, Seattle, WA (US) 98104

(*) Notice: Subject to any disclaimer, the term of this patent is extended or adjusted under 35 U.S.C. 154(b) by 0 days.

(21) Appl. No.: 09/544,778

(22) Filed: Apr. 7, 2000

Related U.S. Application Data

(60) Provisional application No. 60/128,499, filed on Apr. 9, 1999.

(51) Int. Cl.$^7$ ................................................ H02B 1/04
(52) U.S. Cl. ......................... 361/641; 307/150; 429/99
(58) Field of Search ........................... 429/96, 99, 100; 363/142; 307/66, 85, 147, 150; 340/333, 623, 626; 174/37, 38, 52.3; 361/600–603, 622, 641, 657, 659, 826, 827

(56) References Cited

U.S. PATENT DOCUMENTS 4,815,363 A * 3/1989 Harvey ........................ 454/168
6,111,519 A * 8/2000 Bloss, Jr. et al. ........ 340/870.02

* cited by examiner

Primary Examiner—Gerald Tolin
(74) Attorney, Agent, or Firm—Michael R. Schacht; Schacht Law Office, Inc.

(57) ABSTRACT

A vault system for batteries that supply a battery power signal to an electronic device. The vault system comprises an enclosure assembly, a control enclosure, at least one terminal set, and one or more lead pairs. The enclosure assembly contains the batteries. The control enclosure assembly is arranged within the enclosure assembly. The at least one terminal set is arranged within the control enclosure. At least one lead pair is associated with each battery and each lead pair is connected at one end across terminals of the battery associated therewith and at another end to the terminal set. Power cables extend from the control enclosure to the electronic device. The terminal set interconnects the lead pairs and the power cables such that the battery power signal is generated by the batteries connected to the at least one lead pair and present across the power cables.

1 Claim, 5 Drawing Sheets

UNDERGROUND BATTERY VAULT SYSTEM FOR COMMUNICATIONS APPLICATIONS

RELATED APPLICATIONS

This application claims priority of U.S. Provisional Patent Application Serial No. 60/128,499, which was filed Apr. 9, 1999.

TECHNICAL FIELD

The present invention relates to underground vaults for storing batteries and, more specifically, to the storage of batteries used by electrical devices such as uninterruptible power supplies distributed throughout a communications system.

BACKGROUND OF THE INVENTION

Electrical devices are often stored in remote locations and employ batteries for primary or standby power. For example, uninterruptible power supply (UPS) systems are often distributed throughout communications systems to provide power to active components of such systems in the event of utility power failure. Many such UPS systems are connected to batteries that provided power that allows the communication system to operate for a short period of time until utility power is recovered or another source of power can be started.

The present invention is of particular relevance when used in connection with UPS systems distributed throughout a communications system, and that application will be described in detail herein. However, the present application may have broader application to other electrical devices, so the scope of the present invention shall be determined by the claims appended hereto and not the following detailed description.

The batteries used by such UPS systems are may be stored in cabinets attached to utility poles or in above-ground cabinets but are often stored in underground vaults. Underground vaults are commonly a concrete, fiberglass, and/or plastic structure that is buried adjacent to the UPS system. A cable is run from the batteries in the vault to the UPS system to allow the UPS system to generate a standby AC power signal from the DC battery power signal.

Underground storage of UPS batteries is often preferable to above surface cabinets, pole mounted cabinets, and the like for a variety of reasons. In particular, underground vaults: do not require above ground cabinets and thus have less aesthetic impact on the surrounding environment; maintain the batteries at cooler temperatures and thus prolong battery life, which can increase reliability of the UPS system; are less susceptible to damage from vandalism and vehicle accidents; are easier to access for maintenance staff; and are relatively cost-effective to install and upgrade with fewer siting limitations.

A primary problem with underground battery vaults is that a high water table, poor drainage, and the like can flood the battery compartment defined by the vault. A flooded battery compartment can result in short circuiting of the battery terminals and accelerated corrosion of the terminals and related hardware. In addition, such ground water can deposit mud, silt, and other debris on the battery terminals and related hardware that remains after the flood recedes and can interfere with reliability, maintenance, and proper operation of the batteries.

Another problem is that the batteries themselves can fail in a number of ways that might release battery chemicals into the environment.

The need thus exists for systems and methods that protect and contain batteries stored in underground vaults.

RELATED ART

Bell jar systems are often used to protect batteries in underground vaults from flooding. A bell jar system attempts to form a chamber at the top of a battery that traps air over the battery terminals and related hardware during flood conditions. Under some conditions, the trapped air will prevent the terminals and related hardware from becoming immersed in water even if the vault is completely flooded.

However, in many conditions bell jar systems fail to protect the battery terminals and related hardware. Voids, cracks, and holes in the bell jar structure can prevent the trapping of air, allowing the battery terminals and related hardware to be flooded. Even if the bell jar structure properly traps air around the upper portion of the battery, a number of problems can arise.

First, the trapped air will be relatively moist, which results in condensation on the battery terminals and related hardware. This condensation can establish a leakage path that will reduce the effectiveness of the batteries as part of the UPS system electrical circuit and may result in accelerated corrosion because of dissimilar metals used to manufacture the terminals and related hardware.

Second, not only will air be trapped, but hydrogen vented from the batteries may also be trapped. This build-up of hydrogen is undesirable for a number of reasons.

The need thus exists for improved systems and methods for protecting and containing batteries stored in underground vaults.

SUMMARY OF THE INVENTION

The present invention is a vault system for batteries that supply a battery power signal to an electronic device. The vault system preferably comprises an enclosure assembly, a control enclosure, at least one terminal set, and one or more lead pairs. The enclosure assembly contains the batteries. The control enclosure assembly is arranged within the enclosure assembly. The at least one terminal set is arranged within the control enclosure. At least one lead pair is associated with each battery and each lead pair is connected at one end across terminals of the battery associated therewith and at another end to the terminal set. Power cables extend from the control enclosure to the electronic device. The terminal set interconnects the lead pairs and the power cables such that the battery power signal is generated by the batteries connected to the at least one lead pair and present across the power cables. Other configurations are possible within the broader scope of the present invention.

DETAILED DESCRIPTION OF THE INVENTION

Figure 1:
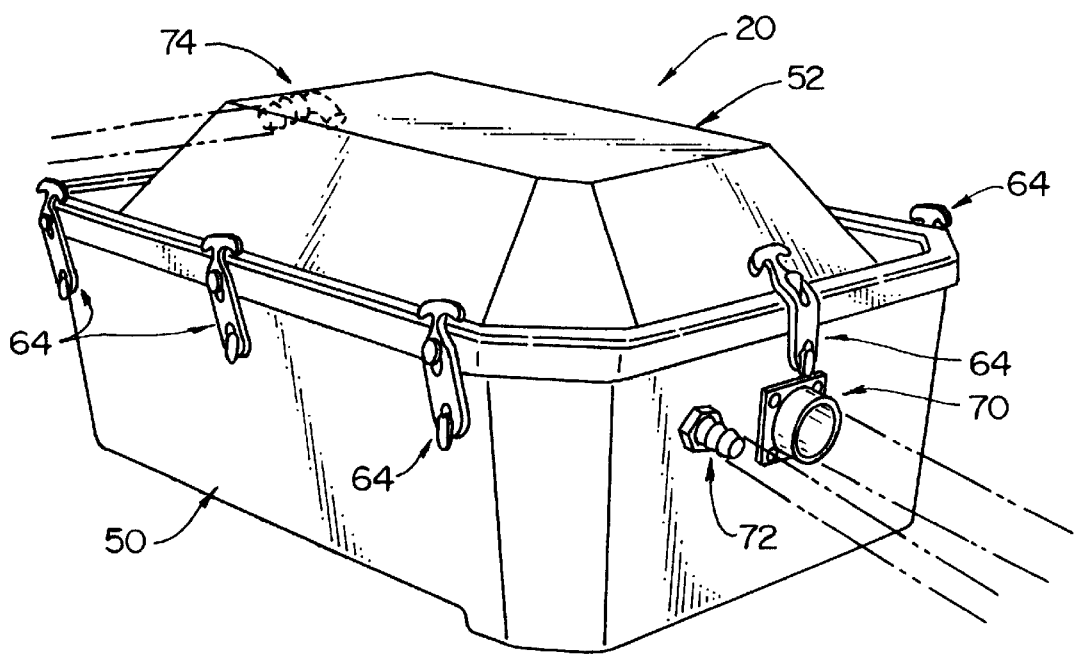
FIG. 1 is a perspective view of the battery vault system of the present invention.

Referring initially to FIG. 1 of the drawing, depicted at 20 therein is a battery vault system constructed in accordance with, and embodying, the principles of the present invention. The battery vault system 20 comprises a mechanical portion and an electrical portion that cooperate to allow one or more batteries to be connected to an electrical device such as a UPS system. The batteries and electrical device are or may be conventional and will be described herein only to the extent required for a complete understanding of the vault system 20.

Figure 2:
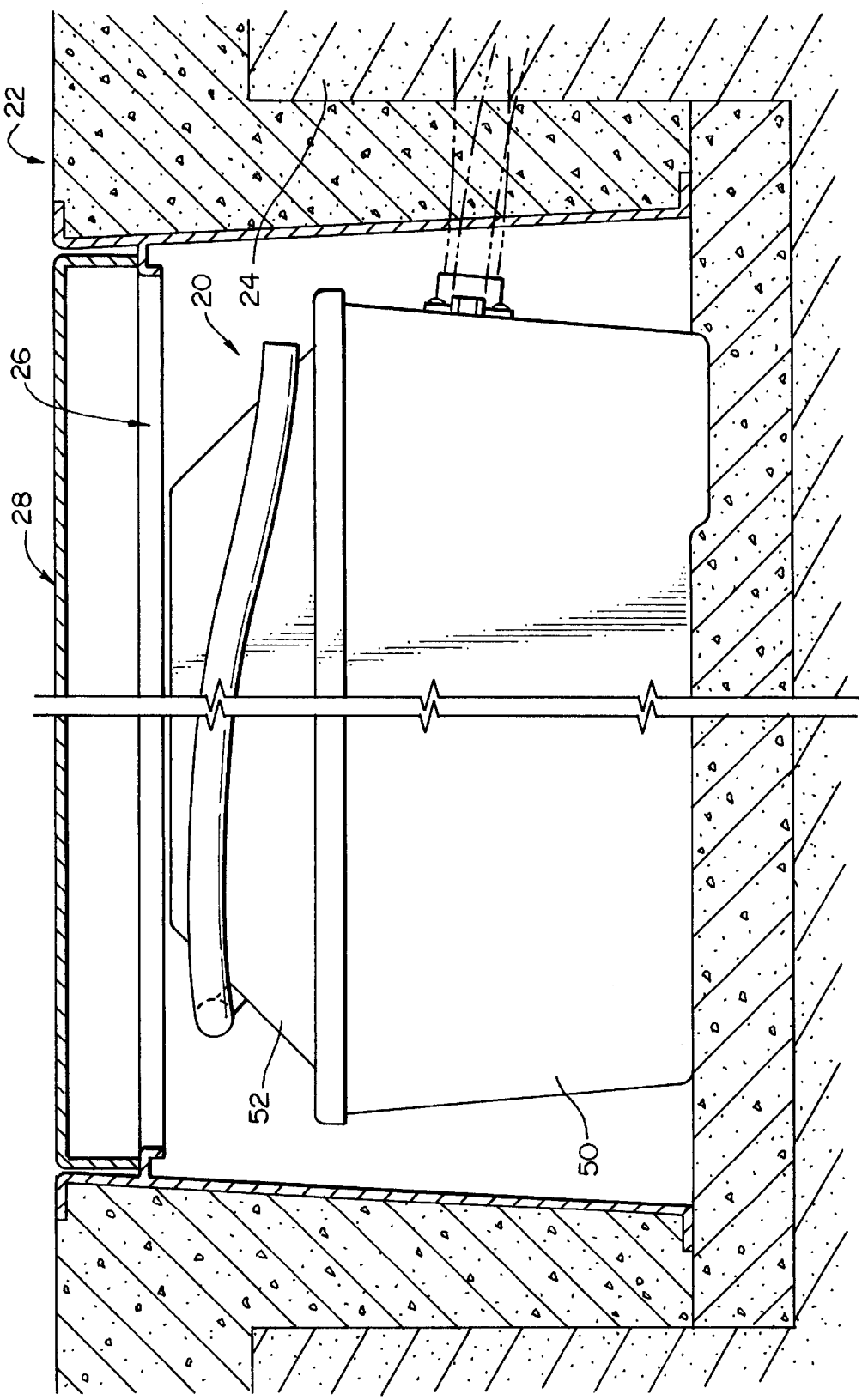
FIG. 2 is a side elevation view of the vault enclosure system of FIG. 1 within an external vault assembly.

Referring for a moment to FIG. 2, it can be seen that the vault system 20 is adapted to be placed into an external vault member 22 that is buried in the ground 24. The exemplary external vault member 22 is a generally rectangular body having five closed sides and an opening 26 formed in its upper side. The external vault member 22 is made of concrete, fiberglass, plastic, or a combination thereof and may be formed in shapes other than rectangular such as cylindrical. The opening 26 is preferably covered by a lid member 28 that may also be made of concrete, fiberglass, and/or plastic. The external vault member 22 and lid member 28 are or may be conventional and will not be discussed herein in detail.

Figure 3:
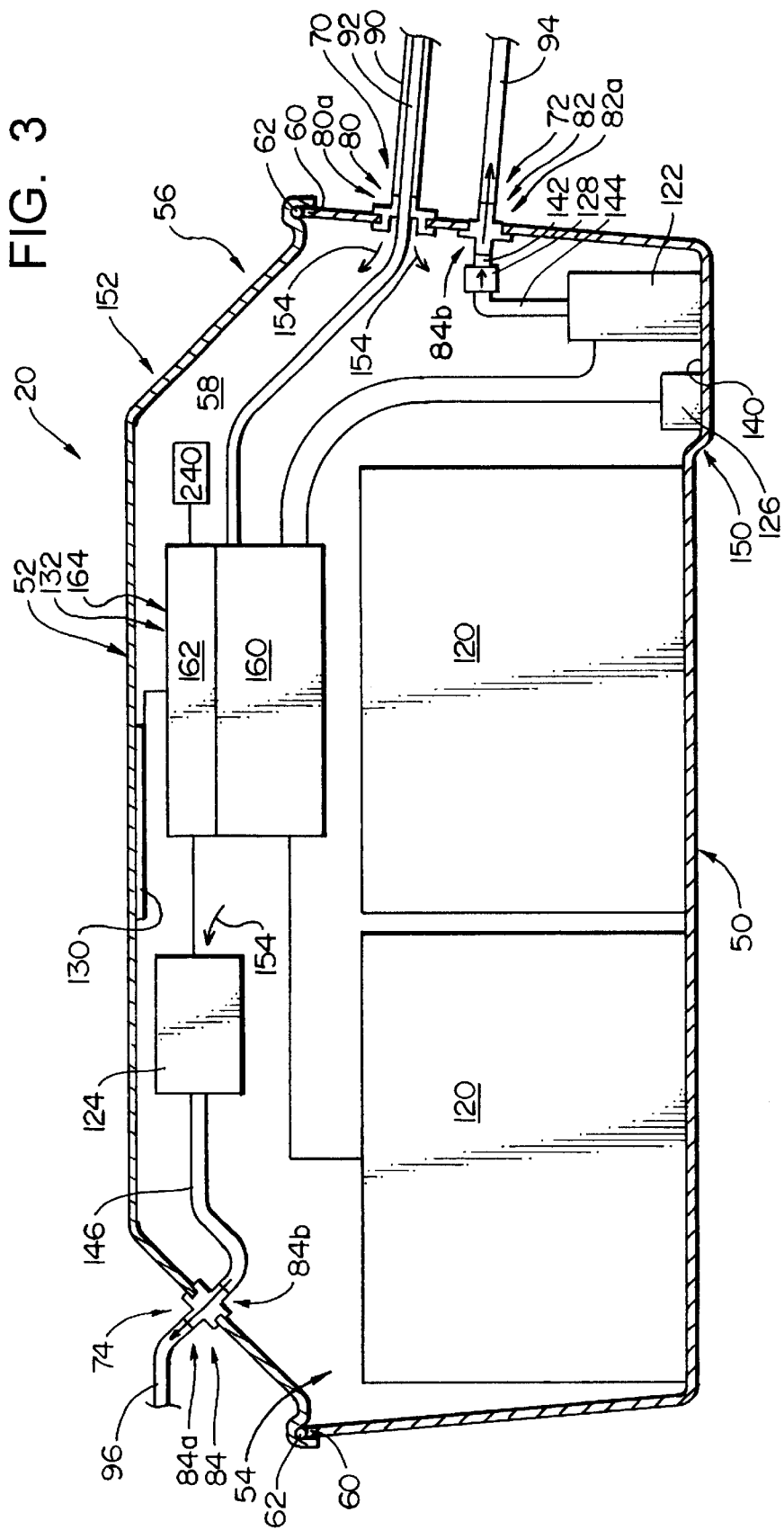
FIG. 3 is a somewhat schematic, side elevation section view of the vault enclosure system of FIG. 1.

FIGS. 1–3 show that the vault system 20 comprises an inner vault member 50 and a cover 52. The inner vault member 50 is sized and dimensioned to contain a number, typically four, six, or eight, of batteries. The cover 52 engages the inner vault member 50 to cover an opening 54 therein and form a sealed vault enclosure assembly 56 defining a sealed chamber 58.

In particular, the cover 52 mates with an upper perimeter edge 60 of the inner vault member 50. A gasket or seal member 62 is arranged between upper edge 60 and the cover 52. A plurality of latch assemblies 64 are spaced around the perimeter edge 60 of the inner vault member 50. These latch assemblies 64 engage the cover 52 to form a water tight seal between the cover 52 and the inner vault member 50. These latch assemblies are or may be conventional and will not be described herein in detail.

The enclosure assembly 56 defines first, second, and third ports or openings 70, 72, and 74. In the exemplary vault system 20, the first and second ports 70 and 72 are formed in the inner vault member 50 and the third port 74 is formed in the cover 52. Other arrangements of the ports 70–74 are possible within the functional constraints described below.

Referring now to FIG. 3, first and second fitting assemblies 80 and 82 are connected to the inner vault member 50 at the first and second ports 70 and 72, and a third fitting assembly 84 is connected to the cover 52 at the third port 74. A wiring conduit 90 is connected to an outer portion 80a of the first fitting assembly. The wiring conduit 90 extends out of the external vault member 22 to at least above ground and preferably to a housing or cabinet containing the electronic device to be powered. A cable bundle 92 extends through the wiring conduit 90 and into the sealed chamber 58 of the vault enclosure assembly 56 through the first port 70.

A liquid outlet hose 94 is connected to an outer portion 82a of the second fitting assembly 82. The liquid outlet hose 94 extends out of the external vault member 22 to a drain or other location where groundwater may be disposed of.

A gas outlet hose 96 is connected to an outer portion 84a of the third fitting assembly 84. The gas outlet hose 96 extends out of the external vault member 22 to a place where hydrogen can be vented without excessive accumulation or otherwise properly contained, used, or disposed of.

FIG. 3 also shows that the vault enclosure assembly 56 contains a plurality of batteries 120, a first pump 122, a second pump 124, a float switch 126, a check valve 128, a hydrogen sensor 130, and a control box 132. The first pump 122 is mounted to the cover 52. The second pump 124 and the float switch 126 are mounted on a bottom surface 140 of the inner vault member 50.

The cable bundle 92 that extends through the first port 70 is connected to the control box 132 as will be described in further detail below. First and second fluid hoses 142 and 144 connect the check valve 128 on one side to an inner portion 82b of the fitting assembly 80 and on the other side to the first pump 122. The check valve 128 is arranged to allow fluid to flow only from the pump 122 out of the enclosure assembly 56 through the second port 72. A gas hose 146 is connected between the second pump 124 and an inner portion 84b of the third fitting assembly 84.

As shown in FIG. 3, the inner vault member 50 comprises a sump portion 150 that defines a lower most portion of the sealed chamber 58; any liquid within the chamber 58 will thus collect in this sump portion 150. In addition, the first pump 122 and float switch 126 are located in this sump portion 150. As will be described in further detail below, the first pump 122 operates, in some situations under control of the float switch 126, to pump water within the enclosure 56 out of the chamber 58 through the first fluid hose 142, the check valve 128, the second fluid hose 144, the second fitting assembly 82, and the liquid outlet hose 94.

The cover 52 comprises a narrowed upper portion 152 in which the second pump 124 and hydrogen sensor 130 are mounted. The second pump 124 operates, under control of an algorithm or the hydrogen sensor 130, to draw air through the wiring conduit 90 as shown by arrows 154 and force this air, and any hydrogen that has collected in the narrowed upper portion 152, out of the sealed chamber 58 through the gas hose 146, the third fitting assembly 84, and the gas outlet hose 96. In this context, it should be noted that a seal should be established between the wiring conduit 90 and the first fitting assembly 80 to prevent moisture from being drawn into the sealed chamber 58.

The first and second pumps 122 and 124 are or may be conventional marine bilge pumps that are designed for use in potentially explosive environments. This type of pump is conventional, and the pumps 122 and 124 will not be described herein in further detail. The float switch 126, check valve 128, and hydrogen sensor 130 also may be or are conventional and thus will not be described herein in detail.

The control box 132 is not conventional. This box 132 comprises a container portion 160 and a lid portion 162 that join together to form sealed control enclosure 164 in which certain electrical devices are located and certain electrical connections are made. The box 132 is relevant primarily in that, even if the interior of the sealed chamber 58 is flooded, the electronics and connections within the box 132 will remain dry.

Figure 4:
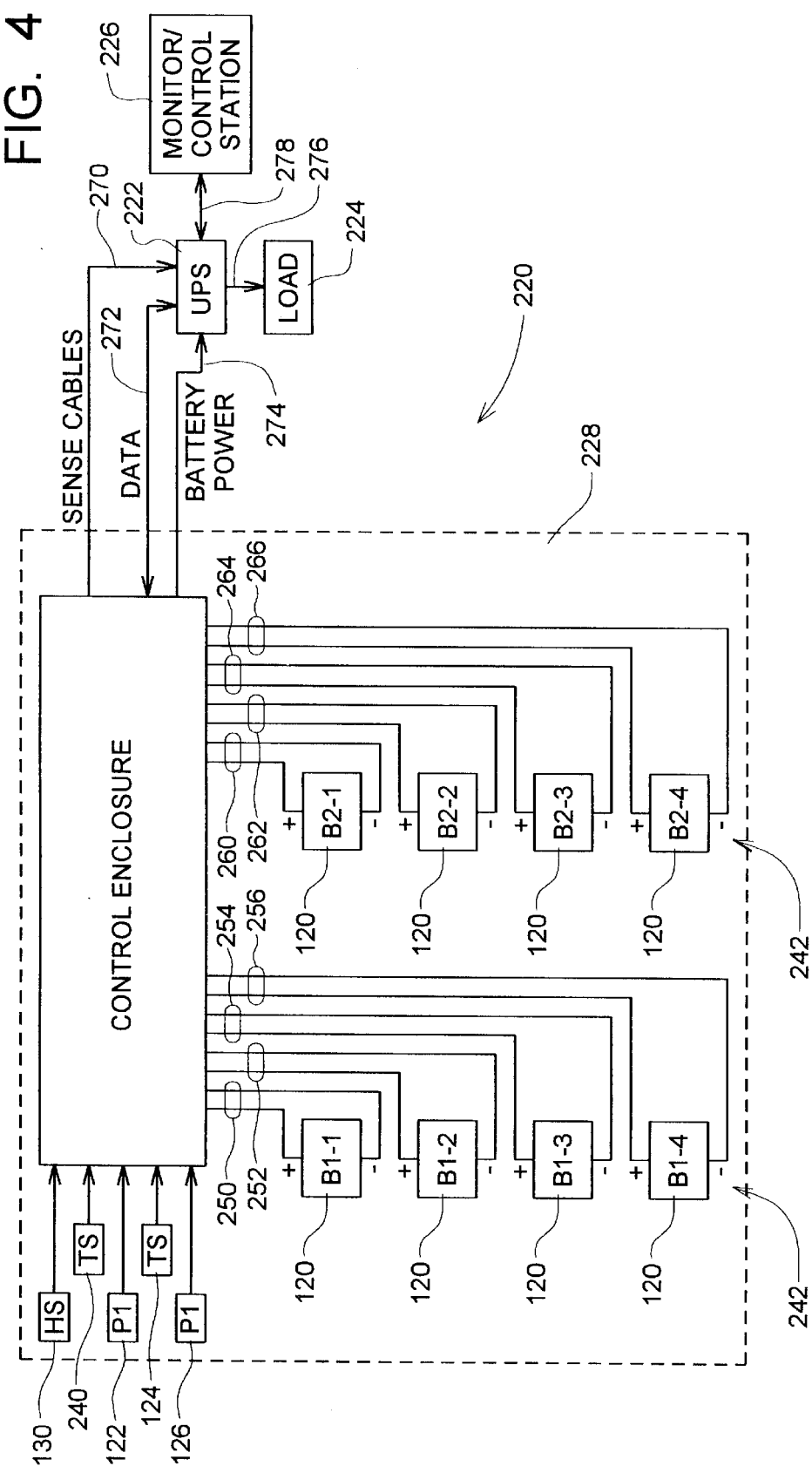
FIG. 4 is a block diagram illustrating the electrical portion of the battery vault system of FIG. 1 in a common environment in which it may be used.

Referring now to FIG. 4, depicted at 220 therein is a block diagram of the electrical system in which the vault system 20 may be used. In particular, FIG. 4 shows the relation of vault system 20 to this broader electrical system 220 with a UPS system 222, load 224, and remote monitor/control station 226. Dotted lines 228 indicate which electrical components are associated with the vault system 20.

In particular, the batteries 120, first pump 122, second pump 124, float switch 126, hydrogen sensor 130, and control box 132 are all schematically depicted in FIG. 4. In addition, FIG. 4 shows a temperature switch 240 forming a part of the system 20. In the exemplary system 20, two sets 242 and 244 of four batteries 120 are used, although more or fewer batteries may be used in different configurations.

Lead pairs 250, 252, 254, and 256 are connected between the batteries of the first set 242 and the control box 132, while lead pairs 260, 262, 264, and 266 are connected between the batteries of the second set 244 and the control box 132.

A bundle of sense cables 270, a data cable 272, and battery power cables 274 extend between the control box 132 and the UPS system 222. Power cables 276 extend between the UPS system 222 and the load 224. A communications line 278 allows data communication between the UPS system 222 and a remote control/monitor station 226 such as a central office or headend.

Figure 5:
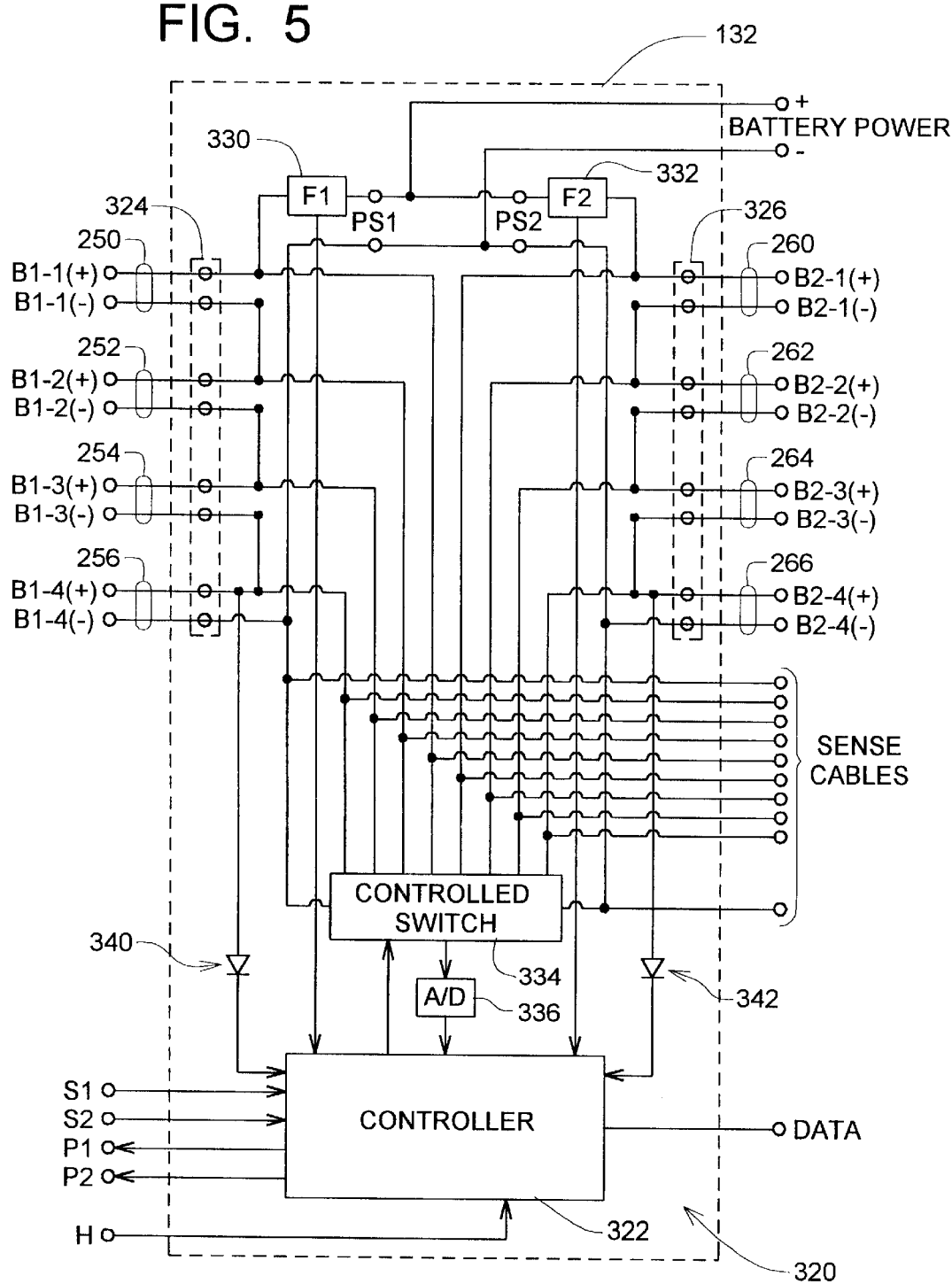
FIG. 5 is a block diagram illustrating a control circuit employed by the battery vault system of FIG. 1.

Referring now to FIG. 5, depicted at 320 therein is an electrical circuit contained by the control box 132. The electrical circuit 320 comprises a controller 322, first and second sets of terminals 324 and 326, first and second fuses 330 and 332, a controlled switch 334, an analog to digital converter 336, and power supply diodes 340 and 342.

The controller 322 receives data from the float switch 126, the hydrogen sensor 130, the temperature sensor 240, the data line 272, and the fuses 330 and 332 and processes this data according to an internal software program. Based on this data, the software program operates the first and second pumps 122 and 124 and sends data over the data line 272 to the UPS system 222. The UPS system 222 can in turn forward this data to the monitor control station 226 for further processing and analysis.

The lead pairs 250–256 and 260–266 route into the control box 132 via watertight connector fittings.

In addition, the terminal sets 324 and 326 allow the lead pairs 250–256 and 260–266 to be connected as appropriate for generation of the battery power signal. In particular, the first and second terminal sets 324 and 326 are connected such that the voltages across the batteries in the first and second battery sets 242 and 244 are added to generate first and second power signals PS1 and PS2. These power signals PS1 are, in the exemplary system 20, equal to 48 volts, assuming that the batteries 120 are fully charged 12 volt batteries. Other voltages can be obtained with different battery sets and batteries. Terminal sets 324 and 326 are connected in parallel such that the battery power signal is based on both the first and second power signals PS1 and PS2.

The fuses 330 and 332 are connected in series with the first and second terminal sets 324 and 326 to protect the electronics in case of a short circuit or other failure.

The terminal sets 324 and 326 are also connected to the controlled switch array 334. The controller 322 can operate the controlled switch array 334 to pass certain voltages to the A/D converter 336 such that the voltage across the positive and negative terminals of any of the batteries 120 can be measured. Because the controller 322 measures the voltage across individual batteries and not simply across an entire set of batteries, a battery that is failing or otherwise not charging properly may be detected and serviced.

In some situations, the UPS system 222 is configured to measure battery voltages, the sense cables 270 are provided to allow a clean, neat, and easy connection to be made between the UPS and the battery terminals.

The power supply diodes 340 and 342 are preferably connected across one battery in each of the battery sets 242 and 244 to provide a redundant power source for the controller 322, but the exact power source for the controller 322 is not critical and will depend upon the specific implementation of the system 20.

The software program run by the controller 322 can be programmed for a specific environment but will typically perform the following functions.

First, the software program can operate the first pump 122 based on the float switch 126 to eliminate water from with the sealed chamber 58. Typically, but not necessarily, the software program will count the frequency and duration of operation of the pump 122. If the first pump 122 operates too frequently and/or for too long (e.g. stuck on), one may infer that a large leak has occurred and/or that the pump 122 has failed and take appropriate steps to maintain the system 20.

Second, the software program can operate the second pump 124 to vent the sealed chamber 58 based on the temperature within the chamber as measured by the temperature sensor 240 and on the voltage across the individual batteries 120. The rate of hydrogen vented from a battery depends upon such factors as the type of battery, the age and condition of the battery, and the temperature of and charge across the battery. Accordingly, the system 20 can eliminate hydrogen even without the hydrogen sensor 130. The hydrogen sensor 130 can thus be optionally added to detect slightly higher levels of hydrogen as a back-up measure.

Third, the software program can monitor the status of the fuses 330 and 332 and, if these fuses 330 and 332 are blown, an alarm signal can be generated indicating that appropriate maintenance is required.

The present invention may be embodied in forms other than the preferred embodiment described above. For example, while the features of the present invention described above are preferably all included in a commercial embodiment of the present invention, not all of these features are required to implement the invention in a more basic form. Accordingly, the scope of the present invention should be determined with reference to the claims appended hereto and not the foregoing detailed description.

What is claimed is:

1. A vault system for batteries that supply a battery power signal to an electronic device, comprising:

an enclosure assembly for containing the batteries;

a control enclosure assembly arranged within the enclosure assembly;

at least one terminal set arranged within the control enclosure;

at least one lead pair associated with each battery, where each lead pair is connected at one end across terminals of the battery associated therewith and at another end to the at least one terminal set;

power cables extending from the control enclosure to the electronic device; wherein the terminal set interconnects the at least one lead pair and the power cables such that the battery power signal is generated by the batteries and connected to the at least one lead pair and is present across the power cables.

* * * * *

UNITED STATES PATENT AND TRADEMARK OFFICE
CERTIFICATE OF CORRECTION

| | | |
|---|---|---|
| PATENT NO. | : 6,356,434 B1 | Page 1 of 1 |
| DATED | : March 12, 2002 | |
| INVENTOR(S) | : Osterman | |

It is certified that error appears in the above-identified patent and that said Letters Patent is hereby corrected as shown below:

<u>Title page,</u>
Item [76], "Thomas A. Osterman" should read -- Thomas S. Osterman --

Signed and Sealed this

Twenty-first Day of October, 2003

JAMES E. ROGAN
*Director of the United States Patent and Trademark Office*